(12) United States Patent
Carcia

(10) Patent No.: US 7,019,772 B2
(45) Date of Patent: *Mar. 28, 2006

(54) METHOD AND SYSTEM FOR ENABLING THE USE OF SINGLE USE RELOADABLE DIGITAL CAMERA

(75) Inventor: Peter P. Carcia, Reading, MA (US)

(73) Assignee: Polaroid Corporation, Waltham, MA (US)

( * ) Notice: Subject to any disclaimer, the term of this patent is extended or adjusted under 35 U.S.C. 154(b) by 699 days.

This patent is subject to a terminal disclaimer.

(21) Appl. No.: 09/861,807

(22) Filed: May 21, 2001

(65) Prior Publication Data

US 2004/0201679 A1 Oct. 14, 2004

(51) Int. Cl.
H04N 5/225 (2006.01)
H04N 9/04 (2006.01)
H04N 7/00 (2006.01)
H04N 11/00 (2006.01)

(52) U.S. Cl. .............................. 348/207.1; 348/231.99; 348/552

(58) Field of Classification Search ........... 348/207.99, 348/207.1, 207.11, 211.3, 552, 231.99, 207.22; 396/6

See application file for complete search history.

(56) References Cited

U.S. PATENT DOCUMENTS

| 4,405,829 A | 9/1983 | Rivest et al. ............... 178/22.1 |
| 4,890,130 A | 12/1989 | Takei et al. .................. 354/288 |
| 4,896,178 A | 1/1990 | Ohmura et al. ........... 354/145.1 |
| 5,126,775 A | 6/1992 | Nakai et al. ................. 354/288 |
| 5,235,364 A | 8/1993 | Ohmura et al. .......... 354/145.1 |
| 5,235,366 A | 8/1993 | Kucmerowski ............. 354/212 |
| 5,619,257 A | 4/1997 | Reele et al. ................... 348/64 |
| 5,694,484 A | 12/1997 | Cottrell et al. .............. 382/167 |
| 5,878,283 A | 3/1999 | House et al. ................... 396/6 |
| 5,974,401 A | 10/1999 | Enomoto et al. ............. 705/40 |
| 6,128,415 A | 10/2000 | Hultgren, III et al. ....... 382/276 |
| 6,876,394 B1* | 4/2005 | Silverbrook ............. 348/207.1 |
| 2001/0022617 A1* | 9/2001 | Takaba et al. .............. 348/207 |
| 2001/0030773 A1* | 10/2001 | Matsuura et al. ........... 358/471 |
| 2001/0040625 A1* | 11/2001 | Okada et al. ............... 348/207 |

FOREIGN PATENT DOCUMENTS

EP 0 860 982 A2 8/1998

(Continued)

OTHER PUBLICATIONS

"Applied Cryptography", 1996, pp. ix, xii, xiii, 461-482, New York, NY, John Wiley and Sons.

(Continued)

*Primary Examiner*—Aung Moe

(57) ABSTRACT

To enable the use of a single use digital camera for acquiring, selecting and storing images, that allows a customer to submit the captured images for development from a convenient location, while also providing the ability to delete unwanted images, a method is disclosed in which a customer is provided a single use digital camera, which the customer uses for acquiring, selecting and storing data corresponding to digital images, the data corresponding to selected images is received from the customer after the storing of the data and the selecting of the images. The single use digital camera does not provide the customer the ability to retrieve the stored data in image form. A method which includes additional steps allows the removal of selected ones of the data from the digital camera thereby preparing the camera for re-use. A system that provides the ability to perform the steps of the method for use of a single use digital camera is also described.

21 Claims, 7 Drawing Sheets

FOREIGN PATENT DOCUMENTS

| | | |
|---|---|---|
| EP | 1 075 138 A2 | 2/2001 |
| JP | 11275421 A * | 10/1999 |
| JP | 2000196931 A * | 7/2000 |
| JP | 2000228740 A * | 8/2000 |
| WO | WO 00/22903 | 4/2000 |
| WO | WO 00/31966 | 6/2000 |
| WO | WO 00/48384 | 8/2000 |
| WO | WO 00/69164 | 11/2000 |
| WO | WO 01/15440 | 3/2001 |

OTHER PUBLICATIONS

"Security ICs Are Targeting Consumer Applications", Nov. 06, 2000, pp. 105-102, Electronic Design.

* cited by examiner

RELOADING SERVER

METHOD AND SYSTEM FOR ENABLING THE USE OF SINGLE USE RELOADABLE DIGITAL CAMERA

CROSS-REFERENCES TO RELATED APPLICATIONS

This application is related to commonly owned patent application Ser. No. 09/861,806 entitled "Method and System for Enabling the Single Use of Digital Cameras" U.S. Publication No. 2004-0201678).

BACKGROUND OF THE INVENTION

1. Field of the Invention

The present invention relates to the use of digital cameras as "reloadable" single use cameras. More specifically, it relates to a method for enabling the single use of a digital camera by a customer while allowing the camera to be conveniently prepared for re-use.

2. Background Description

Single use cameras constitute one of the fastest-growing segments in photography. Every year over 100 million single use cameras are sold in the United States and the market has been growing at over 10 percent per year over the past five years. Single use cameras are used while traveling, during holidays, at amusement parks and at family events such as weddings. They are purchased for convenience and for special events. Representative examples of single use cameras are provided in U.S. Pat. Nos. 4,890,130; 4,896,178; 5,126,775; 5,235,366; and 5,235,364.

The sales of single use cameras have grown almost exponentially since 1989. The customer experience from single use cameras parallels that of other conventional photographic cameras. A large number of the photos taken with single use cameras are either not acceptable or not of interest to the user. Therefore, the user pays for the development of photos that are not wanted or misses a significant portion of their photographic opportunities. Single use cameras currently available do not provide the user the opportunity to select those photos that the user wants to retain.

Presently, after a customer captures images on film using a single use camera, the camera must be returned to a processing location where the film is developed. The customer must travel to a processing or camera return site and must purchase another camera for reuse. If the customer desires to return the camera for processing without travelling to a return site, the customer must use a service that receives the camera through the mail or a package delivery service. Single use cameras currently available do not provide the customer the opportunity to submit the captured images for development from a convenient location without incurring additional time before the images are returned to the customer. Furthermore, Single use cameras currently available do not provide the customer the opportunity to prepare the camera for re-use.

Another recent development in their photographic market is the growth of Internet sites that provide the user with the ability to share their photos with other users and to order prints or reprints of the user's photos. The present model for sharing photos from a conventional photographic camera consists either of scanning the photos, which have been developed conventionally, and loading them onto a web site, or of providing the single use camera or the roll of film to a service provider that develops the photos, scans them and loads them onto the web site. Once the photos have been loaded onto the web site, the user can then select those photos that the user wants to share. While this mode of operation presents an opportunity to the customer, it precludes the possibility of sharing the photos in a timely fashion. Thus, customers are not provided the opportunity to share their photos at the moment of development.

SUMMARY OF THE INVENTION

It is the primary object of this invention to provide a system and method for enabling the use of a single use digital camera for acquiring, selecting and storing images thereby providing the ability to delete unwanted images, and where the system and method enables the customer to submit the stored images for development from a convenient location.

It is another object of this invention to provide a system and method for enabling the use of a single use digital camera that enables the customer to prepare the camera for re-use.

It is another object of this invention to provide a system and method for enabling the use of a single use digital camera in sharing the images at the time they are retrieved.

To achieve these and other objects, one aspect of the invention includes a method of enabling the use of a reloadable single use digital camera for acquiring and storing data corresponding to images and thereafter providing a customer means for retrieving selected images from the stored data, comprising the steps of: providing the customer a reloadable single use digital camera of the type that electronically records and stores data corresponding to images selected by the customer, and provides no means for the customer to retrieve the data in image form from the digital camera, and, receiving the data corresponding to selected images from the customer after the customer has utilized the digital camera to acquire and store data corresponding to images and, thereafter, retrieving selected images from the data for the customer. In another aspect of the invention, the method further comprises the step of receiving enabling information from a server, the information enabling the removing of selected ones of the data from the digital camera after it has been utilized by the customer to acquire and record data corresponding to images and the data has been transmitted to the reloading server, thereby preparing the camera for re-use. The removing (deleting) of the selected ones of the data from the camera occurs while the camera (or the removable storage in the camera) is interfaced to a computer at a client site, thereby enabling the customer to prepare the camera for re-use.

Another aspect of this invention is a system providing means to perform the steps of each of the described methods.

The method and systems of this invention provide a single use digital camera that can be used while traveling, during holidays, at amusement parks, at family events such as weddings, at other special events, when a customer needs a camera and does not have one, or when a conventional camera, due to the large number of moving parts in a conventional camera, would not be used. The single use digital camera of this invention would ensure that the customer could select and keep their best images. The method and systems of this invention enable the use of a single use digital camera that allows the customer to transfer the images to a web site from which they can be shared with other recipients or from which the images can be printed. The sharing of the images would happen when the images are retrieved. The single use digital camera of this invention enables the customer to retrieve the images from any convenient location where a personal computer with an Internet connection is available. Furthermore, digital camera of this invention enables the customer to delete stored data corresponding to images, thereby preparing the camera for re-use ("reloading" the camera), from any convenient location where a personal computer with an Internet connection is available. Thus, the customer can retrieve images or prepare the camera for re-use from home or while travelling.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DETAILED DESCRIPTION

To enable the use of a single use digital camera for acquiring, selecting and storing images that allows a customer to submit the captured images for development from a convenient location, while also providing the ability to delete unwanted images, a method is disclosed in which a customer is provided a single use digital camera, which the customer uses for acquiring, selecting and storing data corresponding to digital images, the data corresponding to selected images is received from the customer after the storing of the data and the selecting of the images. The single use digital camera provides no means for the customer to retrieve the stored data in image form. A method comprising additional steps allows the removal of selected ones of the data from the digital camera thereby preparing the camera for re-use. A system that provides means to perform the steps of the method for use of a single use digital camera is also described.

The System and Method

Figure 1:
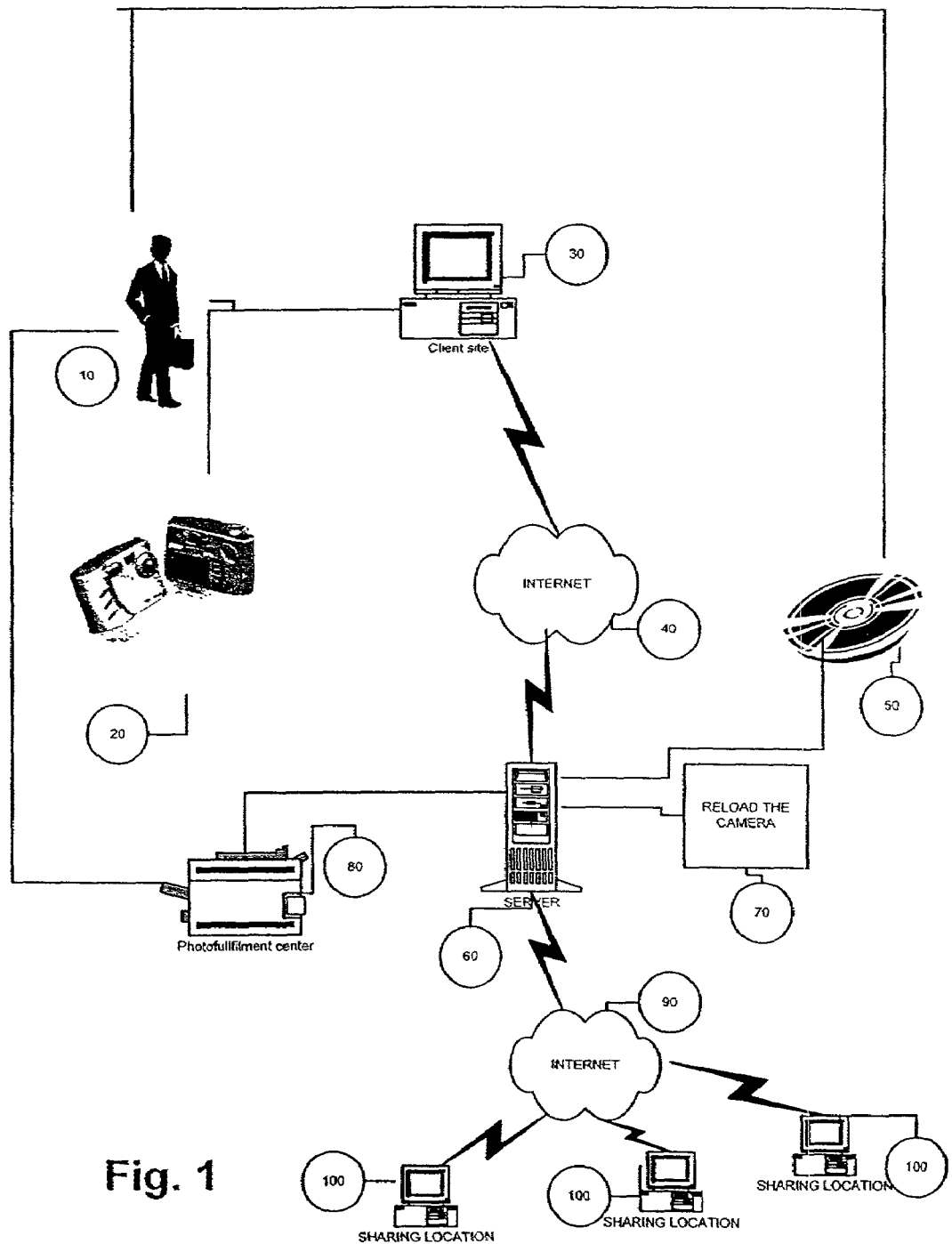
FIG. 1 depicts a graphical representation of an embodiment of the system that enables the use of a single use digital camera.

Referring to FIG. 1, a customer 10, is provided with a single use digital camera 20. Subsequently, the customer uses the camera for acquiring, selecting, and storing data corresponding to digital images. The single use digital camera 20 provides no means for the customer to retrieve the stored data in image form. Upon receipt of the single use digital camera, the customer renders a payment for the use of the digital camera. Such payment can include a refundable portion. The refundable portion can be used to defray the cost of using the digital camera again after it has been prepared for reuse or it can be used to provide an incentive to for the customer to return the camera and retrieve the images. The customer interfaces the single use digital camera to a computer at a client site 30, where the client site can be the customer's personal computer or another personal computer. The selected and stored data corresponding to digital images are downloaded from the camera 20 to the computer at the client site 30 and transmitted via a network, the Internet, 40 to a reloading server 60. The transfer (download) of data from the camera 20 to the computer at the client site 30 can proceed by several different means. If a software driver for the camera exists at the computer at the client site 30, and if an application specific program for transferring data from the camera to the computer or to a web browser in the computer exists at the computer at the client site 30, the consumer can using the application specific program transfer the data from the camera to the computer or to the web browser in the computer. (Such application specific programs are well-known in the art.) If driver software for the camera does not exists at the computer at the client site 30, the methods described in commonly assigned U.S. patent application Ser. No. 09/653,597, filed on Aug. 31, 2000, entitled "Web Based File Upload System", hereby incorporated by reference herein, can be used to upload a driver software and application software (or an "applet") to transfer the data to the reloading server 60. If the methods described in U.S. patent application Ser. No. 09/653,597 are used, any computer with a web browser could be used as the client site 30, thereby allowing the customer to transfer the data from any computer having a web browser. Thus, the customer will be provided with the opportunity to submit the captured data corresponding to digital images from any convenient location.

Innovative means are needed to retrieve the data in image form, hereafter referred to as images, from the data corresponding to digital images. Such innovative means will be detailed below when the reloading server 60 is described. The information as downloaded from the camera is in the form of digital data files, not in image form and has to be retrieved in image form and rendered in a form that is useful to the customer. The retrieved images can be rendered in hardcopy by means of a photo fulfillment center 80, which could be located at the server site or located at a remote point. From the photo fulfillment center 80, the images would then be delivered to the customer 10.

The retrieved images can be also rendered in electronic form. Such an electronic form could be placed in a removable storage medium 50 such as a recordable CD (CD-R or CD-RW), a ZIP™ disk, or one or several floppy disks. The removable storage medium 50 would then be delivered to the customer 10.

Alternatively, their retrieved images could be transmitted via the Internet 60 to a remote node 70 from which the images could be placed in a sharing site and shared with recipients at other computers 100 or transmitted back to the client site 30. If the images are placed in a sharing site and shared with recipients at other computers 100, this mode of operation would decrease the time from acquisition to sharing. At the client site 30 or in storage at the server 60, the customer could specify the list of sharing recipients and provide a list or link to a list of Internet addresses. If desired, the images could be transmitted from the remote node to a photo fulfillment center 80. At their photo fulfillment center the images would be rendered in hardcopy. From the photo fulfillment center 80, the images would then be delivered to the customer 10.

If the retrieved images transmitted back to the client site 30, the customer can store the images in a removable storage medium 50 or in any other computer readable medium. Or, the customer can render the images in hardcopy utilizing a photo-printer at the client site 30 or at a remote site 70.

Upon retrieving the data in image form, the camera can be "reloaded", that is, prepared for reuse. Such a preparation for reuse can occur at the client site 30. The customer interfaces the single use digital camera 20 to a computer at a client site 30, where the client site can be the customer's personal computer or another personal computer. The selected data corresponding to digital images are removed from memory and deleted from the camera 20. The deleting of the selected data from the camera 20 interfaced to the computer at the client site 30 can proceed by several different means. If a software driver for the camera exists at the computer at the client site 30, and if an application specific program for deleting data from the camera exists at the computer at the client site 30, the consumer can, in conjunction with a an executable program at the server 60, delete the selected data from the camera using the application specific program at the computer. (Such application specific programs are well-known in the art.)

If driver software for the camera does not exists at the computer at the client site 30, an extension of the methods described in commonly assigned U.S. patent application Ser. No. 09/653,597, can be used to upload driver software for the camera and application software (or an "applet") to delete the selected data from the camera. The extension of the methods of U.S. patent application Ser. No. 09/653,597 to the manipulation of data in the camera is described in commonly assigned U.S. patent application Ser. No. 09/861, 791, filed on this same date, entitled "Web Based File Manipulation System", hereby incorporated by reference herein. The application software ("applet") could, in one embodiment, be the same application software ("applet") used for transfer the data to the reloading server 60 but, after a transaction, the application software ("applet") would enable deleting selected data. If the methods based on those described in U.S. patent application Ser. No. 09/861,792, are used, any computer with a web browser could be used as the client site 30, thereby allowing the customer to "reload" the camera from any computer having a web browser. Thus, the customer will be provided with the opportunity to "reload" the camera from any convenient location.

Figure 2A:
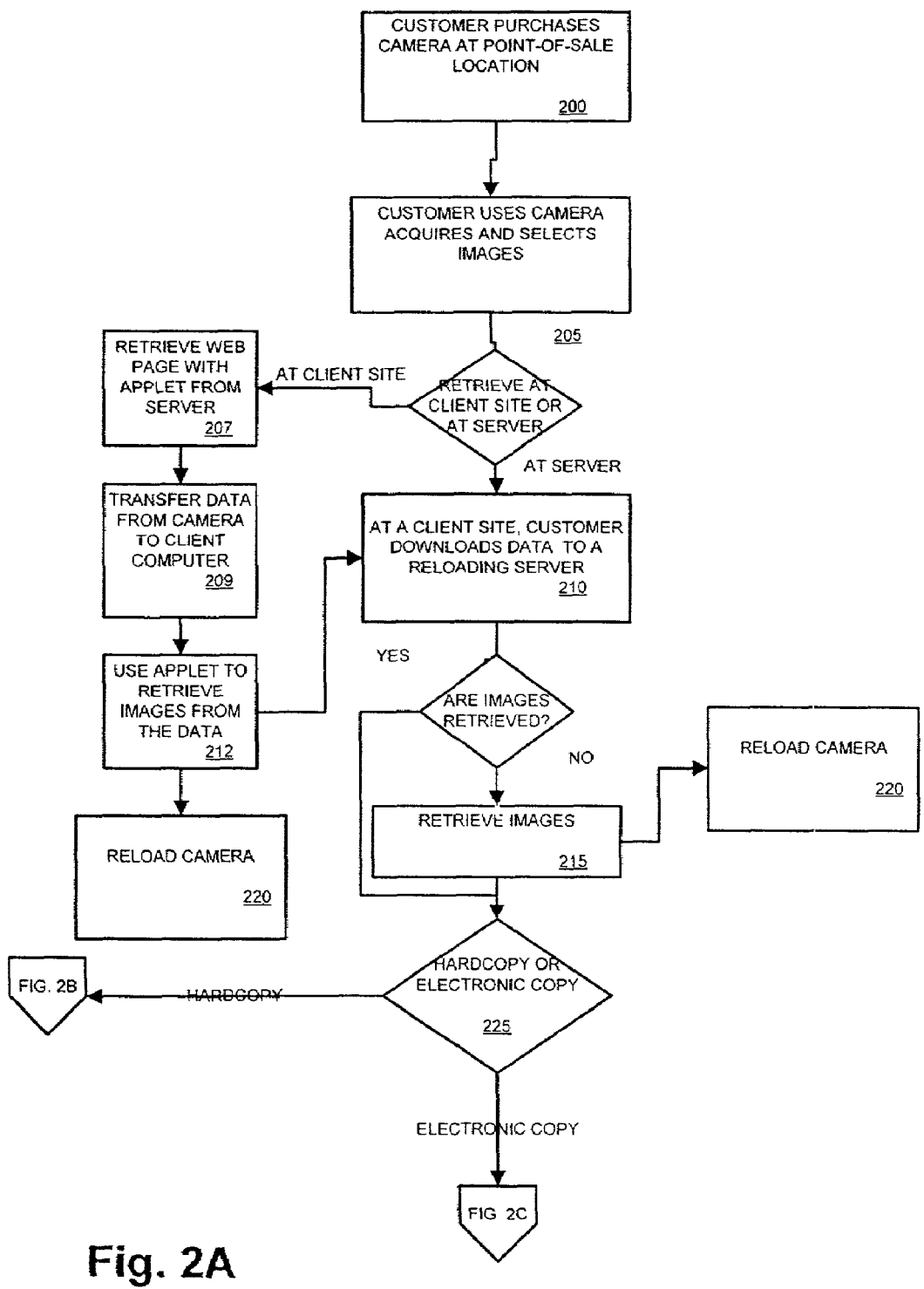
FIGS. 2A, 2B, and 2C depict a flowchart of an embodiment of the method that enables the use of a single use digital camera.
Figure 2B:
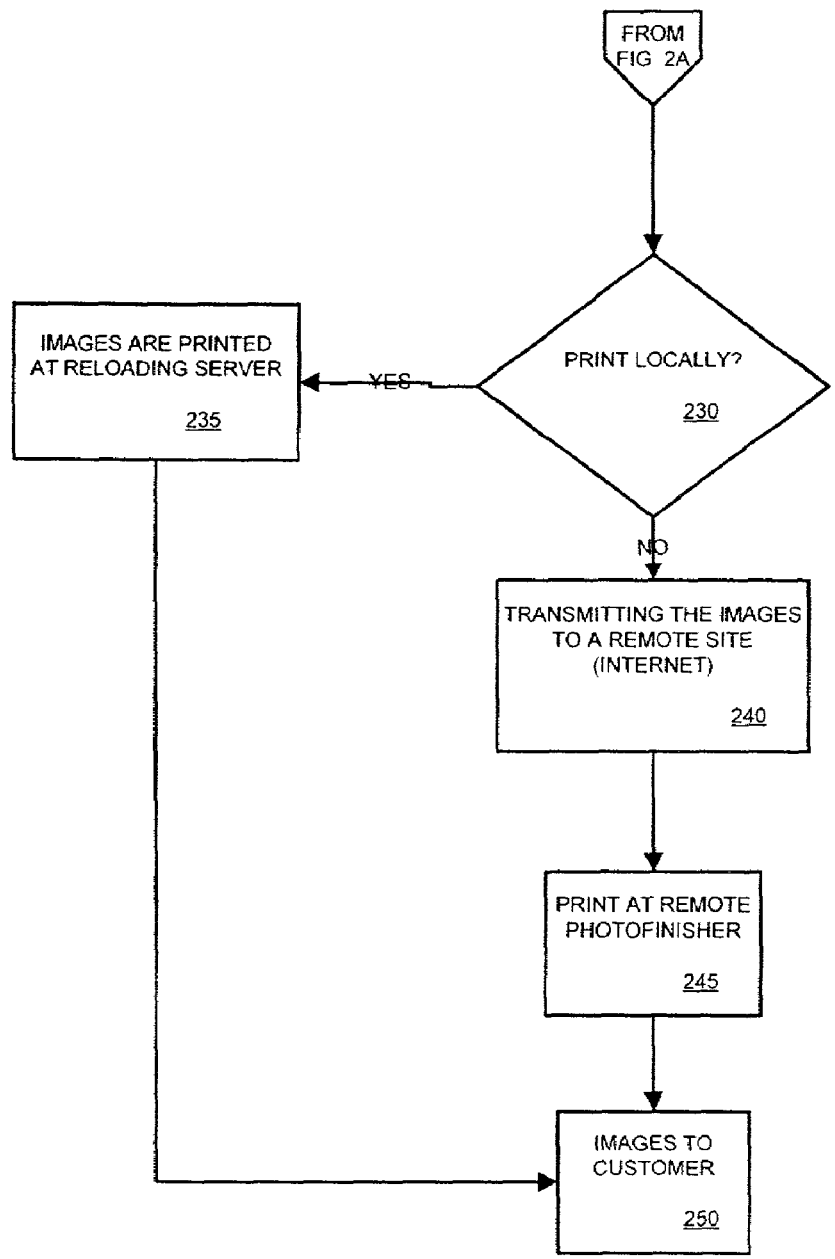
Figure 2C:
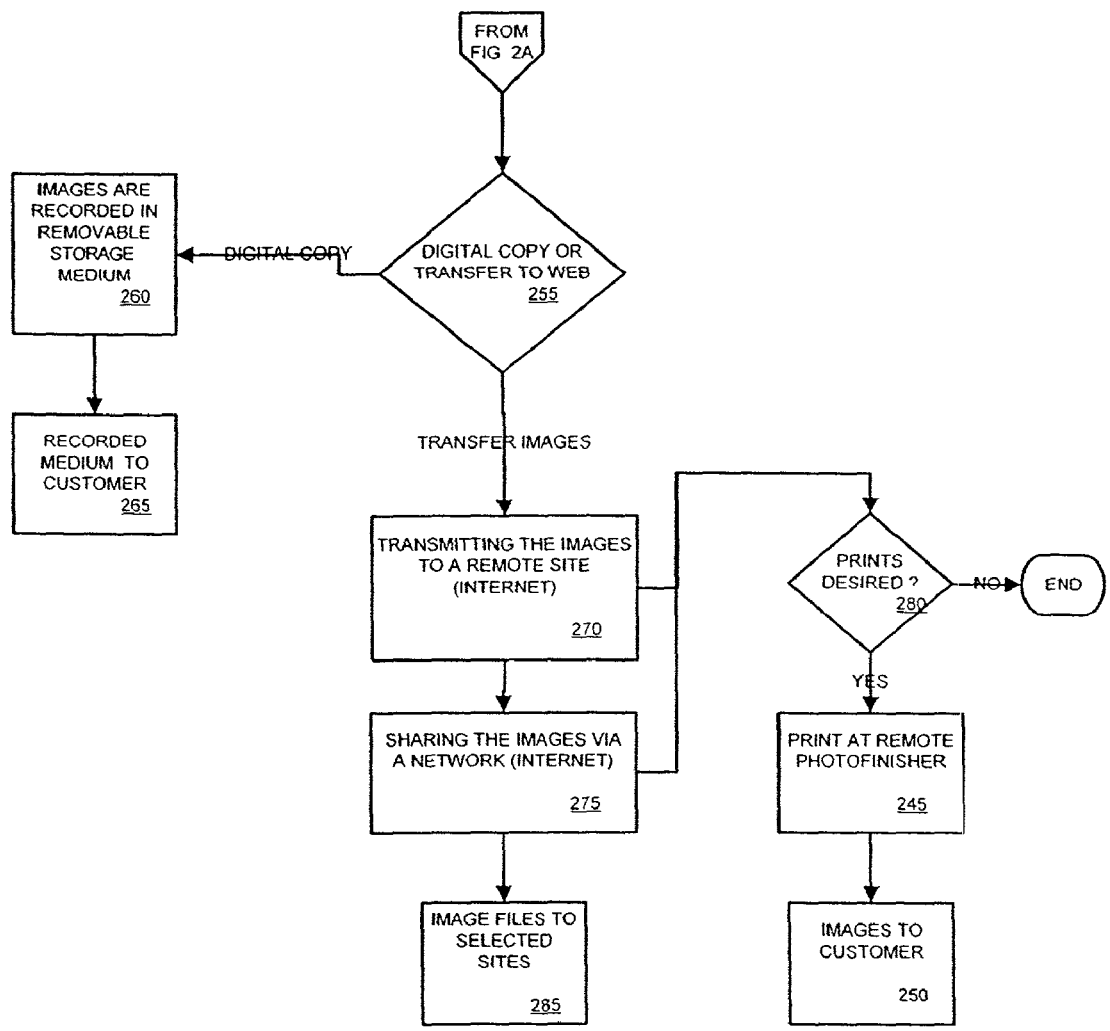

FIGS. 2A, 2B, and 2C provide a flowchart of one embodiment of the method to enable the use of a single use digital camera. Referring to FIG. 2A, the customer purchases the single use digital camera 20 at a point of sale location (step 200). In one embodiment, the single use digital camera 20 includes means for the customer to view the images that the customer acquires, means for storing data corresponding to images and means for selecting a predetermined number of the stored data corresponding to images for continued storage while removing the remainder of the stored data corresponding to images from storage within the single use digital camera 20. In that embodiment, selected data corresponding to images can not be removed from storage by the customer after being selected for continued storage. The single use digital camera of this invention 20 provides no means for the customer to retrieve the data in image form. The customer then uses the single use digital camera 20 to acquire and store images (step 205). Subsequently, the customer downloads the data corresponding to images, via a network such as the Internet 40, to a reloading server 60 for image retrieval (processing) (step 210). Selected data from the stored data corresponding to images are then retrieved in image form (step 215). The digital camera or the removable storage media in the digital camera is connected to computer at the client site 30. At the client site 30, the customer 10 selects stored data to be deleted. The computer at the client site 30 is in communication with the reloading server 60 via a network such as the Internet 40. Under control of the reloading server 30, the ones of selected stored data corresponding to images are then removed from the digital camera or the removable storage media in the digital camera, and the camera is prepared for re-use (step 220).

The retrieved images are retrieved for the customer in hardcopy form or electronic form (step 225). Referring to FIG. 2B, when the selected images are retrieved in hardcopy form, the retrieving of the images in hardcopy form can occur at location of the reloading server 30 or at a remote site (step 230). If the retrieving of the images in hardcopy form occurs at the location at which the camera was returned, the selected images are printed at that location (step 235). The printed images are then returned to the customer (step 250). If the retrieving of the images in hardcopy form occurs at a remote site, the selected images are transmitted to a remote site, for example, a node of a network, (step 240) and are printed at a remote photofinisher (step 245). The printed images are then returned to the customer (step 250). Referring to FIG. 2C, when the selected images are retrieved in electronic form, the selected images can be retrieved for the customer in digital copy (step 260), for example, a removable storage medium 50 such as a recordable CD (CD-R or CD-RW), a ZIP™ disk, or one or several floppy disks, or can be transmitted to a remote node of a network (step 270), for example transmitted via the Internet 60 to a remote node 70. If the selected images are retrieved for the customer in digital copy, the digital copy, for example the storage medium, is then provided to the customer (step 265). If the selected images are transmitted to a remote node of a network, the retrieved images are then shared via the network (step 275) with at least one of a plurality of other entities 100 located at other remote nodes of the network. The retrieved images are then transmitted to the sites of the at least one of a plurality of other entities 100 (step 285). If hardcopy of the shared retrieved images is desired (step 280), then the shared retrieved images are printed at a remote photofinisher (step 245). The printed shared retrieved images are then returned to the customer (step 250). While the flowchart of FIGS. 2A, 2B, and 2C indicate different paths for the different options that a customer has rendering the retrieved images, it should be apparent that the customer can select all means of obtaining the image data (hardcopy, digital copy, transfer to a remote network site and share) concurrently.

The Single Use Digital Camera

Figure 3A:
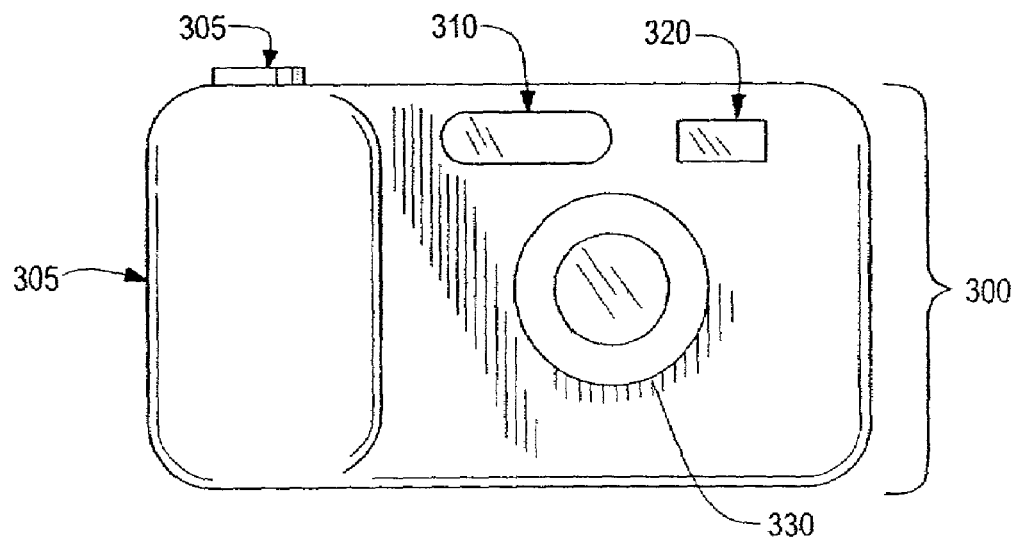
FIGS. 3A and 3B are graphical representations of the front and back view of a typical handheld digital camera.
Figure 3B:
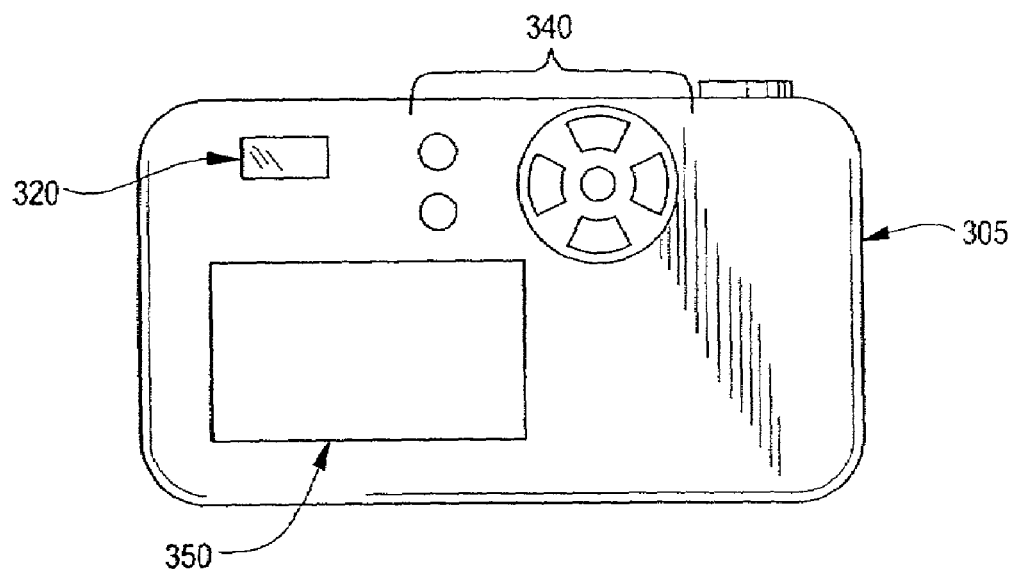

FIGS. 3A and 3B depict the front and back views of a single use handheld digital camera 300 according to this invention. The camera comprises a camera body 305 which houses the camera components. A viewfinder 320 is optical coupled to the lens 330. A flash assembly 310 is also located on the body 305. A shutter release button 315 serves to actuate the shutter and initiate the capture of the image. A display device 350 is mounted on the body. In one embodiment the display device 350 is comprised of an LCD and provides the capability of viewing the image immediately after image acquisition. A number of selection buttons 340 are placed in the vicinity of the display. The selection buttons 340 are used to display menus on the display device and provide the capability to select from those menus and select options in camera operation. The camera user can then display the image that has been acquired and using the selection buttons can select or delete images and permanently store the selected images.

Figure 4:
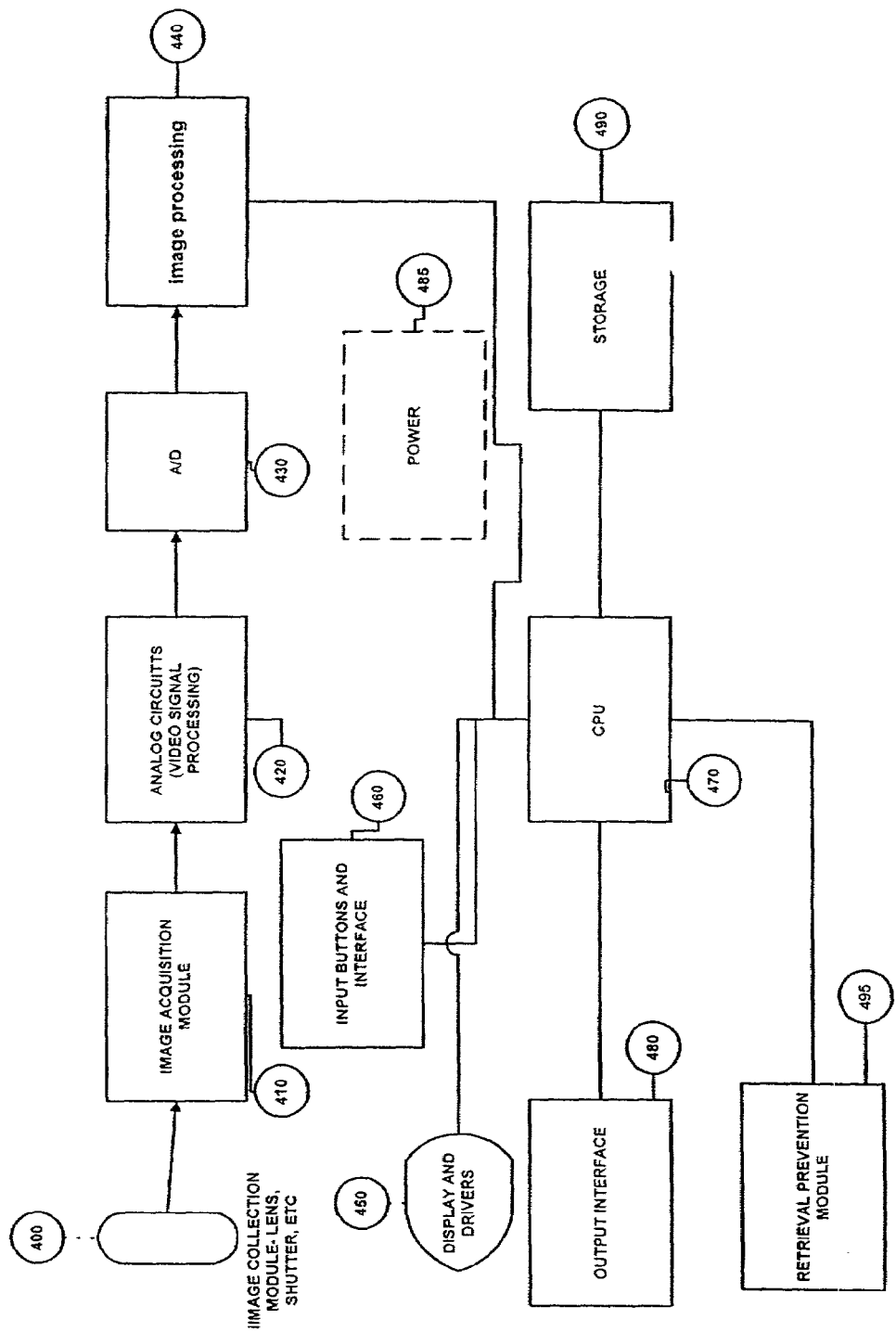
FIG. 4 depicts a block diagram of selected components of an embodiment of the single use digital camera.

FIG. 4 is a block diagram of selected components of one embodiment of the single use digital camera. The image collection module 400 comprises optical components and a shutter (not shown) that collect the image radiation and focus it on an image acquisition device (also not shown) which is part of an image acquisition module 410. The image acquisition module also comprises device drivers and acquisition electronics which are well known in the art and also not shown. In one embodiment, the image acquisition device would be a CCD imager. In another embodiment: the image acquisition device would be a CMOS imager. Al, the output of the image acquisition module 410, the image is comprised of analog electronic signals. Those analog electronic signals are processed by analog (video signal processing) circuits 420 and then converted to digital signals by A/D circuits. 430 Further image processing, required to generate missing color samples and available to provide some image enhancement, is provided by image processor 440. It should be apparent that is possible to perform the image processing at the central processing unit 470 instead of at a separate image processor 440. The image can then be displayed using the display 450. The image can also deleted or selected using the input buttons 460. The selected images can be permanently stored in the storage module 490. The storage module 490 may comprise one or more semiconductor memory devices, or may comprise an external memory module (not shown). The external memory module can comprise a magnetic disk drive, a flash memory, or any of various other types of memory modules known in the relevant art.

A central processing unit (CPU) 470 provides central control for the above described functions and can also perform functions such as image compression, image enhancement and encoding. It should be apparent that in some embodiments the central processing unit 470 could be comprised of several processors in order to provide faster processing of data, separate control from processing, or optimize the design. An innovative retrieval prevention module 495 provides inputs to the central processing unit to ensure that the customer has no means of retrieving the images.

The details of the embodiment of the retrieval prevention module 495 depend on the means used to prevent retrieval of the images. In one embodiment, electronic means may be used to encode (encrypt) the image data is at the single use digital camera. The encrypted data is decoded (decrypted) at the point of return terminal. In the preferred mode of operations, the image data is first compressed in the CPU 470 and then encoded. It should be apparent to those skilled in the art that more than one processor could be used in the encoding and compression. The encoding (encrypting) algorithm is preferably applied before final storage. Since encryption randomizes the data and hides patterns, effective compression should take place before encryption. In one possible embodiment, the image data is compressed and selected for permanent storage before encryption. Once encrypted the data can not be read as an image before it is decrypted. This procedure effectively prevents the retrieval of the images by the customer.

One choice of the encryption system is the so-called public key/private key system. In this system one key (public key) is used for encrypting the data and a different key (private key) is used for decrypting the data. The word key is used symbolically here and is analogous to protecting the data with a "lock", wherein a key is used to obtain access to the data or to lock the data. In encryption, the key is the characteristic of the transformation between the original data and the encrypted data or of the transformation between the encrypted data and the original data. One widely used public key/private key algorithm is the RSA algorithm that was the first described in U.S. Pat. No. 4,405,829 issued on Sep. 20, 1983. (This and other encryption algorithms are also described in B. Schneier, "Applied Cryptography", $2^{nd}$ edition, 1996, ISBN 04-71117099.) The public key could be generated in software and the encryption algorithm could be performed in software. In that case, the entire system resides in the CPU 470 and its operating memory. Alternatively, the key generation and the encryption algorithm could reside in dedicated hardware. (See, for example, "Security ICs Are Targeting Consumer Applications", Electronic Design, Nov. 6, 2000, pp. 105–112, and p. 153.) The choice between software and the dedicated hardware is dictated by considerations of cost and processing speed.

In other possible embodiments, using electronic means, the image data is compressed using a unique compression algorithm where the details of the algorithm are not known to the camera user. In still another embodiment, using electronic means, the image data is stored using a unique format where the details of the format are not known to the known to the camera user.

The Reloading Server

Figure 5:
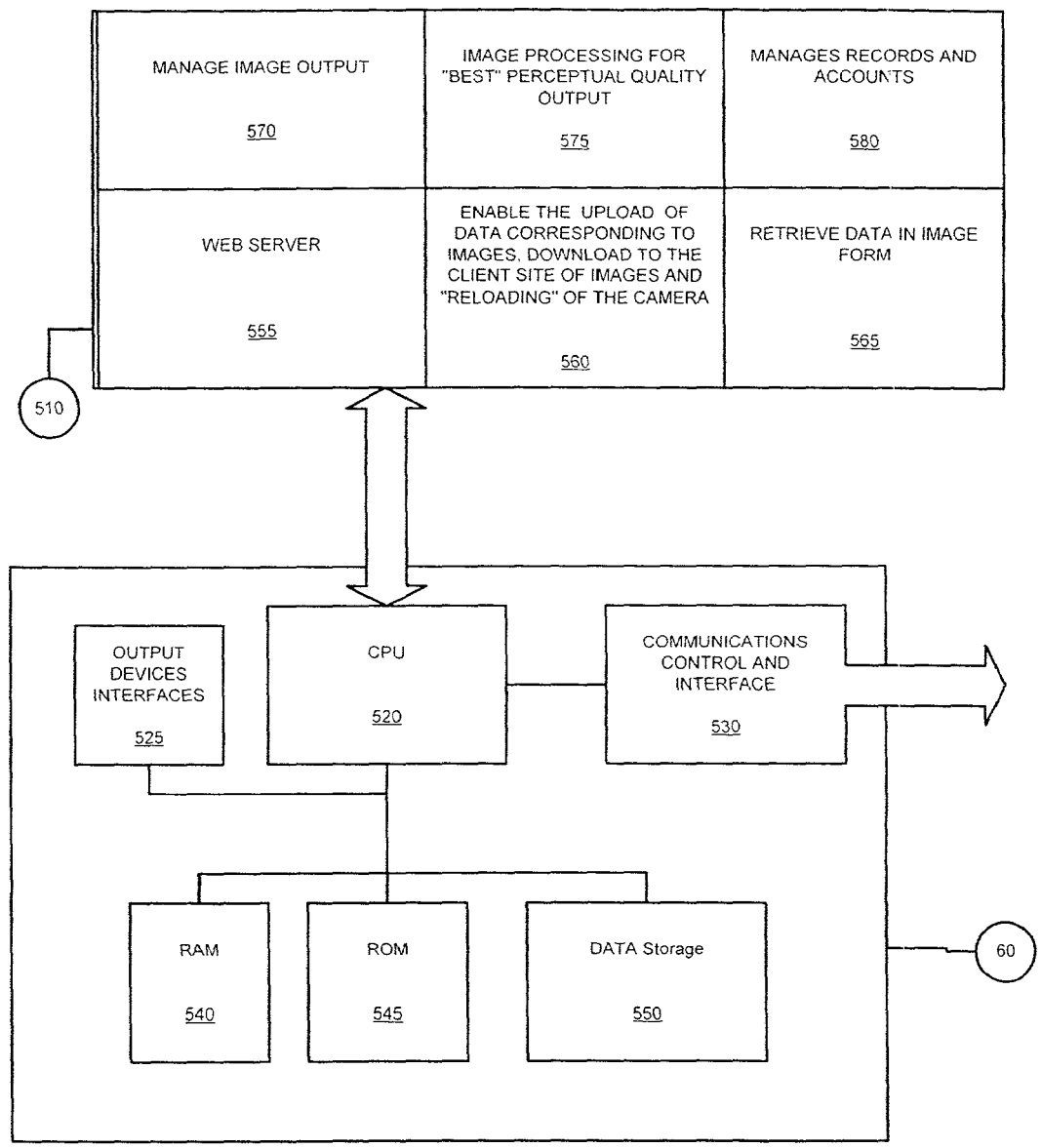
FIG. 5 depicts a block diagram of selected components of an embodiment of the reloading server.

FIG. 5 depicts the block diagram of selected physical and logical components of one embodiment of the reloading server 60. The reloading server 60 comprises certain hardware components 515 and logical (software) components 510. It should be apparent that besides the selected components shown in FIG. 5, the reloading server 60 comprises other hardware and software components that are well known in the art. The central processing unit (CPU) 520 provides central control for the other hardware components and executes the software components 510, as described below. A main memory 540, such as a random access memory (RAM) or other dynamic storage device system stores information and instructions to be executed by processor 520. Main memory 540 also may be used for storing temporary variables or other intermediate information during execution of instructions by processor 520. A read only memory (ROM) 545 stores static information and instructions for processor 520. One or more data storage devices 550 also store information and instructions. Transmission of the data over a network is accomplished by communications control module 530 (a modem, for example) under the control of the processor 520. A modem 530 represents just one example of a data communication interface that can be used to convey information to a network such as the Internet. It should be apparent that other systems could be used to achieve the same result. Wireless links could also be implemented as a modem. In any such implementation, communication module and interface 530 sends and receives electrical, electromagnetic or optical signals that carry digital data streams representing various types of information.

The processor 520 executes software elements including the selected elements shown in FIG. 5. It should be apparent that besides the selected elements shown in FIG. 5, the processor executes other software, such as a kernel, device drivers, an operating system, as is well known in the art. In one embodiment, the processor 520 manages the retrieval in image form from the data corresponding to digital images 565, executing the necessary operations to obtain image data in original (as acquired) form 565, manages the process to output image data to hardcopy or digital output 570, performs the necessary operations to enable the upload the data and to enable the "reloading" of the camera 560, and manages records and accounts 580.

Upon selecting hardcopy output, the image data can be processed to insure best perceptual quality output. Since the single use digital camera 305 is of a known type, its characteristics are known and a device profile can be constructed in the manner described in U.S. Pat. No. 6,128,415 (Hultgren, et al., Device Profiles For Use In A Digital Image Processing System, issued on Oct. 3, 2000), which is hereby incorporated by reference herein. Then, the method described in U.S. Pat. No. 5,694,484 (Cottrell et al., System and Method for Automatically Processing Image Data to Provide Images of Optimal Perceptual Quality, issued on Dec. 2, 1997), also hereby incorporated by reference herein, can be used to provide an image of optimal perceptual quality rendered by a hardcopy device of known characteristics. The processor 520 executes the necessary operations 575 to produce an image of best perceptual quality.

If the customer selects hardcopy output, and an output device is available at the server's site, the images are transferred to the output device 525 through a printer interface (not shown) under control of the processor 520. The output device 525 is preferably a photo quality printer such as a dye sublimation printer, or a photo quality ink jet printer, or a digital mini-lab.

If remote hardcopy output is desired, or if image sharing is desired, the images have to be transmitted to a remote node of a network (such as the Internet For example, if image sharing is desired, under control of the processing unit, the images are uploaded in a manner well known in the art., through the data communication interface 530 to a designated.

If digital copy output is selected by the customer, the images are transferred to a digital copy output device 525 through a standard interface. (Interfaces between processing units and removable storage modules are well known in the art.) The digital copy output device 525 would preferably be a digital media output device (not shown) such as a CD-R or CD-RW drive, a ZIP™ drive, a floppy disk drive, or any other removable digital media drive.

The operations necessary to enable image retrieval 565 depend on the innovative means used in the single use digital camera 305 to prevent retrieval of the images. When the retrieval of the images is prevented by encoding (encrypting) the image data at the single use digital camera, the encoded data will then be decoded at the reloading server. If the encryption system is the so-called public key/private key system, one key is used at the camera to encrypt the data and a different key (private key) is used at the reloading server for decrypting the data. The private key could be generated in software and the decryption algorithm could be performed in software. In that case, the entire system resides in the processing unit 520 and its operating memory. (It should be apparent that the processor 520 could comprise more than one actual processor in order to achieve required speed or functionality.) The instructions for the key generation and the decryption algorithm may be read into main memory 540 from another computer-readable medium, such as other memory 550. Execution of the sequences of instructions contained in main memory 540 causes the processing unit 520 to perform the process steps described herein.

Alternatively, the key generation and the decryption algorithm could reside totally or partially in dedicated hardware. In that case, the dedicated hardware could be considered as a component of the processor 520. Thus, embodiments of the invention are not limited to any specific combination of hardware circuitry and software.

In other possible embodiments of the operations necessary to enable image retrieval 565, if the image data has been compressed using a unique compression algorithm where the details of the algorithm are not known to the camera user, the decompression algorithm must be supplied to the processor. In one configuration, the entire system resides in the processing unit 520 and its operating memory. The instructions decoding algorithm may be read into main memory 540 from another computer-readable medium, such as other memory 550.

In still other possible embodiments, if the image data has been stored using a unique format where the details of the format are not known to the known to the camera user, instructions on format conversion from the proprietary format to a standard format (for example, JPEG, or TIFF) must be provided.

In one embodiment, the operations necessary to enable upload of data corresponding to images, download to the client site of images and "reloading" of the camera (deleting selected data corresponding to images) 560, utilize the methods of U.S. patent application Ser. No. 09/653,597 and of U.S. patent application Ser. No. 09/861,792, U.S. patent application Ser. No. 09/653,597, provides a computer implemented method for uploading information from a peripheral device (such as a digital camera 20) to a web site at the server site 60 through a computer at the client site 30. After connecting the peripheral device to the client computer, the customer uses a conventional web browser installed on the client computer to navigate to a predetermined web site. The web site includes a software component, such as a Java applet, that is downloaded to the client computer and executed within the web browser. If the software component determines that the peripheral device driver is not already installed on the client computer, the software component downloads and installs the peripheral device driver on the client site computer 30. The user uploads the information to the web site. The web server, that contains the web site which includes the software component, can be implemented as software executing in the processing unit 520.

U.S. patent application Ser. No. 09/861,792 provides a computer-implemented method for deleting information from a storage component in a peripheral device (such as a digital camera 20), connected to a client computer, where the deletion occurs under instructions from a web server. In the same manner as in U.S. patent application Ser. No. 09/653,597, after connecting the peripheral device to the client computer, the customer uses a conventional web browser installed on the client computer to navigate to a predetermined web site; the web site includes a software component, such as a Java applet, that is downloaded to the client computer and executed within the web browser. The software component is able to provide outputs to and receive inputs from the server 60. The web server, that contains the web site which includes the software component and that receives outputs and provides inputs to the software component when the software component is executing in the computer at the client site 30, is implemented as software executing in the processing unit 520. The software component executing at the client site computer 30 initiates or "invokes" transactions with the services at the server 60. The transactions, in the case of a reloadable single use camera, are requests, for re-use of the camera and payment for such re-use. The payment is verified, accepted and recorded by software applications that manage records and accounts 580. The verification of the payment could require interaction with another server (rot shown). The software applications that manage records and accounts 580 are executed by the processing unit 520. The software application that enables the upload of data corresponding to images, download to the client site of images and "reloading" of the camera (deleting selected data corresponding to images) 560 invokes the software component that had been downloaded to the computer at the client site 30 in order to delete from the camera 20 selected data corresponding to images where the number of data items deleted is determined by the request for re-use of the camera and payment for such re-use. Using the methods of U.S. patent application Ser. No. 09/653,597 and U.S. patent application Ser. No. 09/861,892 allows any computer with a web browser to be used as the client site 30.

In another embodiment of the means to enable image retrieval, when the retrieval of the images is prevented by encoding (encrypting) the image data at the single use digital camera, the software component described in U.S. patent application Ser. No. 09/861,792 also includes the instructions for the key generation and the decryption algorithm. In this embodiment, the receiving of the data corresponding to selected images after the customer has utilized the digital camera to acquire and store data corresponding to images and the retrieving of selected images from the data for the customer occur at the computer at the client site 30 under the control of the software component. The web site that includes the software component constitutes the means for retrieving selected images.

If a device driver for the camera 20 and application software, where the application software is able to provide outputs to and receive inputs from the server 60, have been previously installed in the computer at the client site 30, then the software application that enables the upload of data corresponding to images, download to the client site of images and "reloading" of the camera (deleting selected data corresponding to images) 560 can be implemented using methods which are well known in the art and similar to those of U.S. patent application Ser. No. 09/861,792 except that the software application resides in the computer at the client site 30. (In the case of the software component residing at the client site, the means for image retrieval would reside at the server 60).

The term "computer-readable medium" as used herein refers to any medium that participates in providing instructions to the processor 520 for execution. Such a medium may take many forms, including but not limited to, non-volatile media and volatile media. Non-volatile media includes, for example, optical or magnetic disks, as one component of the memory 550. Volatile media includes dynamic memory, such as main memory 540.

Thus, embodiments have been disclosed of a system for providing a customer retrieved selected stored images, the images corresponding to data stored in a single use digital camera wherein the digital camera provides no means for the customer to retrieve the stored data in image form, and where the system comprises means for receiving the data corresponding to selected images from the customer after the customer has utilized the digital camera to acquire and store data corresponding to images, and means for retrieving selected images from the data for the customer. Embodiments have also been disclosed of a system that comprises elements of the above described system and further comprises means for transmitting instructions executable by a computer system, where the instructions cause the removal of selected ones of the data from the storage area in the digital camera. The latter system enables the "reloading" of the single use digital camera.

Embodiments have also been disclosed of a method of enabling the use of a single use digital camera for acquiring and storing data corresponding to images and thereafter retrieving selected images from the stored data corresponding to images for the customer and for a method that enables the removal of selected ones of the data from the storage area in the digital camera.

Other embodiments of the invention, including combinations, additions, variations and other modifications of the disclosed embodiments will be obvious to those skilled in the art and are within the scope of the following claims.

What is claimed is:

1. A method of enabling the use of a reloadable single use digital camera for acquiring and storing data corresponding to images and thereafter providing a customer means for retrieving selected images from said stored data upon the customer transmitting said data to a reloading server, said method comprising the steps of:
   providing the customer said reloadable single use digital camera of the type that electronically records and stores said data corresponding to said images selected by the customer, and provides no means for the customer to retrieve said data in image form from said digital camera;
   wherein said digital camera includes a means for said customer to view said images that said customer acquires and stores as data corresponding to said images and for selecting a predetermined number of said stored data corresponding to said images for continued storage while removing the remainder of said stored data corresponding to said images from storage within said digital camera; and,
   wherein said selected data corresponding to said images cannot be removed from storage by said customer after being selected for continued storage; and,
   receiving said data corresponding to said selected images from said customer after said customer has utilized said digital camera to acquire and store data corresponding to said images and, thereafter, retrieving selected images from said data for said customer.

2. The method of claim 1 wherein said selected images are retrieved for said customer in hardcopy form.

3. The method of claim 2 wherein said retrieving of said images in hardcopy form occurs at a remote photo-finishing node of a network.

4. The method of claim 3 wherein said network is the Internet.

5. The method of claim 1 wherein said selected images are retrieved for said customer in electronic form.

6. The method of claim 5 further comprising the step of sharing said retrieved images via said network with at least one of a plurality of other entities located at other remote nodes of said network.

7. The method of claim 6 further comprising the step of providing said retrieved images in hardcopy form.

8. The method of claim 7 wherein the step of providing said retrieved images in hardcopy form occurs at a remote photo-finishing node of said network.

9. The method of claim 6 wherein said network is the Internet.

10. The method of claim 1 further comprising the step of:
    transmitting instructions executable by a computer system, said instructions causing the removal of selected ones of said data from said digital camera after it has been utilized by said customer to acquire and record data corresponding to images and said data has been transmitted to the reloading server.

11. The method of claim 1 wherein the step of providing a camera to a customer further comprises the step of accepting a payment from said customer.

12. The method of claim 11 wherein said payment includes a refundable portion.

13. A system for providing a customer retrieved selected stored images, said images corresponding to data stored in a single use digital camera, wherein said digital camera provides no means for said customer to retrieve said stored data in image form, and wherein said digital camera includes a means for said customer to view said images that said customer acquires and stores as data corresponding to said images and for selecting a predetermined number of said stored data corresponding to said images for continued storage while removing the remainder of said stored data corresponding to said images from storage within said digital camera, said system comprising:

means for receiving said data corresponding to said selected images from said customer after said customer has utilized said digital camera to acquire and store data corresponding to said images; and, means for retrieving said selected images from said data for said customer, said means for retrieving not being available to said customer.

14. The system of claim 13 wherein said retrieving means provide said selected images to said customer in hardcopy form.

15. The system of claim 14 wherein said retrieving means provide said images in hardcopy form at a remote photofinishing node of a network.

16. The system of claim 15 wherein said network is the Internet.

17. The system of claim 13 wherein said retrieving means provide said selected images to said customer in electronic form.

18. The system of claim 17 further comprising means for transmitting said retrieved selected images to a remote node of a network.

19. The system of claim 18 further comprising means for sharing said retrieved selected images via said network with at least one of a plurality of other entities located at other remote nodes of said network.

20. The system of claim 19 wherein said network is the Internet.

21. The system of claim 18 further comprising:

means for transmitting instructions executable by a computer system, said instructions causing the removing of selected ones of said data from said digital camera after it has been utilized by said customer to acquire and record data corresponding to images.

* * * * *